United States Patent [19]
Lection et al.

[11] Patent Number: 6,144,381
[45] Date of Patent: Nov. 7, 2000

[54] SYSTEMS, METHODS AND COMPUTER PROGRAM PRODUCTS FOR COMPASS NAVIGATION OF AVATARS IN THREE DIMENSIONAL WORLDS

[75] Inventors: David Bruce Lection; Karen Ruth Kluttz, both of Raleigh, N.C.; Abbott Purdy Brush, II, Woodbridge, Conn.

[73] Assignee: International Business Machines Corporation, Armonk, N.Y.

[21] Appl. No.: 08/856,166

[22] Filed: May 14, 1997

[51] Int. Cl.$^7$ ................................................ G06F 3/00
[52] U.S. Cl. .......................................... 345/355; 345/437
[58] Field of Search .................................. 345/326, 339, 345/348, 349, 355, 357, 977, 419, 427, 433, 437, 145

[56] References Cited

U.S. PATENT DOCUMENTS

| | | | |
|---|---|---|---|
| 5,303,337 | 4/1994 | Ishida et al. | 345/419 |
| 5,313,201 | 5/1994 | Ryan | 340/961 |
| 5,359,703 | 10/1994 | Robertson et al. | 345/419 |
| 5,414,801 | 5/1995 | Smith et al. | 345/419 |
| 5,588,097 | 12/1996 | Ono et al. | 345/437 |
| 5,608,850 | 3/1997 | Robertson | 345/427 |
| 5,734,805 | 3/1998 | Isensee et al. | 345/419 |
| 5,774,111 | 6/1998 | Lecland et al. | 345/145 |
| 5,835,692 | 11/1998 | Cragun et al. | 345/419 |
| 5,861,889 | 1/1999 | Wallace et al. | 345/433 |
| 5,874,956 | 2/1999 | LaHood | 345/339 |
| 6,008,814 | 12/1999 | Baldwin et al. | 345/427 |
| 6,014,142 | 1/2000 | LaHood | 345/355 |

OTHER PUBLICATIONS

Morabito, "Enter the On–Line World of Lucasfilm", RUN, pp. 24–28, Aug. 1986.

"Welcome to Club Caribe— Club Caribe Handbook", Quantum Computer Services, Inc., pp. 1–11, 1989.

Fukuda et al., "Hypermedia Personal Computer Communication System: Fujitsu Habitat", Fujitsu Sci. Tech. J., pp.197–205, Oct. 1990.

Carlsson et al., "DIVE—a Multi–User Virtual Reality System", IEEE Virtual Reality Annual International Symposium, pp.394–400, Sep. 1993.

Benford et al., "Supporting Cooperative Work in Virtual Environments", The Computer Journal, vol. 37, No. 8, pp.653–667, 1994.

*Primary Examiner*—Crescelle N. dela Torre
*Attorney, Agent, or Firm*—Myers Bigel Shelby & Sajovec; Jeanine S. Ray-Yarletts

[57] ABSTRACT

A system, method, or computer program product for navigating an object in a virtual reality world in accordance with the present invention provides for receiving a pivot control signal from a user via a graphic user interface (GUI) control, and pivoting the object in response to the pivot control signal. The GUI control preferably comprises a compass control configured for receiving the pivot control signals from a user through a point and click device such as a mouse. By clicking on the compass control interface, the user can cause the object, such as an avatar, to rotate a relative number of degrees from its original direction substantially instantaneously, or alternatively, the user may depress a mouse button and drag the pointer about the compass control so as to cause the object to turn under essentially real time control of the user while displaying a view of the object during the pivot. Further, an incoming stimulus indicator may be provided in the compass control so that the user can pivot to face the incoming stimulus.

16 Claims, 7 Drawing Sheets

SYSTEMS, METHODS AND COMPUTER PROGRAM PRODUCTS FOR COMPASS NAVIGATION OF AVATARS IN THREE DIMENSIONAL WORLDS

FIELD OF THE INVENTION

The present invention generally relates to three dimensional worlds, and more particularly, to navigating avatars in three dimensional virtual reality worlds.

BACKGROUND OF THE INVENTION

The Internet is a decentralized network of computers that can communicate with one another via the TCP/IP (transmission control protocol/Internet protocol) network protocol. Although the Internet has its origins in an agency started by the United States Department of Defense in the late 1960's called the U.S. Advanced Research Project Agency (ARPANET), it has only recently become a worldwide communication medium. The explosive growth in use and traffic over the Internet may be due, at least in part, to the development in the early 1990's of the World Wide Web (WWW), which is one of several service facilities provided on top of the Internet. Other facilities include a variety of communication services such as electronic mail (e-mail), telnet, usenet newsgroups, Internet relay chat (IRC), a variety of information search services such as WAIS and Archie, and a variety of information retrieval services such as FTP (file transfer protocol) and Gopher. While these facilities have serviced the research-oriented user well, it is the multimedia capability of the WWW which may have brought the Internet into prominence.

The WWW is a client-server based facility that comprises a number of servers (e.g, computers connected to the Internet) on which web pages or files reside and clients (e.g., web browsers) which interface the users with the web pages. Specifically, web browsers and software applications such as WebExplorer® (IBM Corporation) or Navigator® (Netscape Communication Corporation) send a request over the WWW to a server requesting a copy of a web page identified by a uniform resource locator (URL) which denotes both the server where the web page resides and the file or files which comprise the web page. In response, the server sends a copy of the requested file(s) to the web browser which displays the web page to the user.

The web pages on the WWW may be hyper-media documents written in a standardized language called hypertext markup language (HTML). Thus, a typical web page includes text together with embedded formatting commands, referred to a tags, which can be used to control the font size, the font style (for example, whether italic or bold), the layout of the text, or other document attributes. A web browser parses the HTML script in order to display the text in accordance with the specified format. In addition, a web page can also contain a reference, in terms of another URL, to a piece of multimedia data, for example, an image, a video segment, or an audio file. The web browser responds to such a reference by retrieving and displaying or playing the data. This often requires the web browser to launch another software application such as a plug-in or helper program that is particularly configured for displaying or playing the multimedia data as formatted. Alternatively, such multimedia data may form its own web page, without any surrounding HTML text.

Some web pages also contain one or more references to other web pages, which need not be on the same server as the original web page. Such references may generally be activated by the user selecting particular locations on the screen, typically by clicking a primary button of a pointing device such as a mouse. These references or locations are known as hyperlinks, and are typically flagged by the browser in a particular manner (for example, any text associated with a hyperlink may be in a different color or underlined). If the user selects the hyperlink, then the referenced page is retrieved and replaces the currently displayed page. Further information about HTML and the WWW can be found in *World Wide Web and HTML* by Douglas MacArthur, pp. 18–26 and *Dr. Dobbs' Journal*, December 1994, and in *The HTML Sourcebook* by Ian Graham, John Wiley Publishers, New York (1995).

Out of an effort to heighten the sensory experience of the WWW, three dimensional virtual reality languages have begun to be developed. One such language is the virtual reality modeling language (VRML, pronounced "ver-mel"). VRML is a standardized language for describing the animation and three dimensional modeling of geometric objects. VRML allows a three dimensional scene(s) or world(s) to be manipulated in an interactive manner over the Internet or locally. In either case, VRML allows for the creation of virtual environments which may be shared by multiple users. Virtual reality worlds are generally defined with reference to an x-axis, a y-axis, and a z-axis so as to allow movement with six degrees of freedom. Thus, unlike HTML which provides for relaying and formatting text and images, and for hyperlinks to other web pages, VRML provides for the organization and interaction of three dimensional objects and scenes in a hierarchical fashion within a virtual three dimensional space.

A VRML browser is used to view a three dimensional virtual world or virtual environment. The VRML browser may be a helper program or plug-in to a web browser that is launched when the web browser detects that a file being downloaded is a VRML document. The VRML browser provides means for allowing the user to move around or navigate the three dimensional virtual world. Typical navigation controls for a VRML browser include walk, spin, look, slide, and point. Typically, the walk control allows the user to move forward and backward within a world, the spin control allows the user to turn in an arcuate fashion within a world, the look control allows the user to zoom in or pan out from a particular area within a world, the slide control allows the user to move sideways in an arcuate fashion within a world, and the point control allows the user to return to an initial vantage point.

In addition to navigating through a VRML world, a VRML browser (i.e., the client) may share a world with one or more other VRML browsers. In this context, a user of a VRML browser may select a three dimensional representation of him/herself known as an "avatar" which is an object or group of objects. The user then navigates in the world with other avatars that represent other users of VRML browsers in that world (e.g., other clients). Thus, as a user's avatar moves through the world the user is able to see other users' avatars moving as well, and vice versa. The navigation controls utilized in conjunction with an avatar are typically the same as those described above.

The positions of the avatars within a VRML world are tracked by a matrix-based central object server. Thus, as the position or behavior of an avatar changes, the changes are detected by the central object server and rebroadcast out to the client web browsers. Current navigational controls typically allow for movement of the avatar with six degrees of freedom. Particularly, current navigational controls allow the user to traverse the world in the direction of the x, y, or z axis.

However, a problem with current navigation controls associated with avatars is that they are too general in nature. The controls are typically developed to work reasonably well in all worlds. The differences in dimension and perspective from one world to another, however, prevent the navigational controls from allowing precise navigation. One particular situation where this is especially noticeable is when navigating within a tight area. It is often desirable for the user to look in different directions without having to motor or move in any one direction. As mentioned above, current navigation controls typically require the avatar to turn in an arcuate fashion or otherwise move to face a new direction. Another circumstance where precise navigation is desirable is when an avatar is sharing a world with multiple users and an avatar wishes to turn to face another avatar in order to acknowledge the other avatar's presence and return some complimentary greeting or gesture. If the avatar is required to turn in an arcuate fashion, it may move away from the other avatar or otherwise require unwanted movement to face a user.

In light of the above discussion, a need exists for improvements in the navigation of users or objects under a user's control in a virtual environment.

SUMMARY OF THE INVENTION

It is therefore an object of the present invention to provide a user friendly and intuitive graphic user interface (GUI) control for controlling one or more aspects of navigating an object in a three dimensional virtual world.

It is another object of the present invention to provide more useful navigation of an object in a three dimensional virtual world.

It is yet another object of the present invention to allow a user to more readily control an object to face other users' stimulus in a three dimensional virtual world.

These and other objects of the present invention are provided by a GUI control for an object that enables pivot navigation, whereby the object pivots about one of its defining axes so as to turn in place. The GUI control is preferably responsive to a pointing device such as a mouse. Therefore, utilizing the pointing device, an object such as an avatar can be turned or pivoted in place. Furthermore, the GUI control may provide a directional indication of an incoming stimulus so that the object can be turned or pivoted in place to face the incoming stimulus. The GUI control of the present invention may be advantageous when navigating in close proximity to other object(s) in a three dimensional virtual world because it provides a precise control over movement of the object.

In a preferred embodiment, a GUI control in accordance with the present invention is implemented with a compass-like appearance, wherein the object under the control of the GUI control is facing an ordinal coordinate of the compass rosette, preferably in the northerly direction, that is, the direction facing the top or twelve o'clock position of the compass. In addition, in the preferred embodiment, the object controlled is an avatar. By actuating (clicking and/or clicking in combination with dragging) a pointing device, the object can be pivoted or turned in place by a designated amount to face a new direction. An incoming stimulus vector indicator can be displayed on the GUI control to indicate the relative direction of an incoming stimulus.

In accordance with an aspect of the preferred embodiment, an object is navigated in a three dimensional virtual world by receiving a control signal from a user, and pivoting the object in response to the control signal. The pivotal movement of the object is in two of the six degrees of freedom defined by reference to an x-axis, y-axis, and z-axis. It is preferred that the two of the six degrees of freedom be about the y-axis of the object, wherein the y-axis corresponds to the vertical or up/down axis in the virtual world.

In accordance with another aspect of the present invention, the pivot control signal is utilized to determine an angular value used in pivoting the object. The angular value may include an indicator of a pivot direction. The angular value can be determined by calculating the value of an angle about a center point of the GUI control, wherein the angle is defined by the center point of the GUI control, a top-most point on the outer radius of the GUI control, and a click point on the GUI control. The click point, in this sense, is a position on the GUI control where the user actuated (e.g., "clicked") a button of the pointing device (e.g., a mouse) or other input device.

In accordance with another aspect of the present invention, the pivot of the object can be substantially instantaneous, or alternatively, can be under essentially real-time control of the user, wherein the view of the object is displayed during the pivot.

As will be appreciated by those of skill in this art, the above described aspects of the present invention may be provided as methods, apparatus or computer readable program products.

Other features and advantages of the present invention will become apparent to one with skill in the art upon examination of the following drawings and detailed description. It is intended that all such additional features and advantages be included herein within the scope of the present invention, as defined in the appended claims.

DETAILED DESCRIPTION OF PREFERRED EMBODIMENTS

The present invention now will be described more fully hereafter with reference to the accompanying drawings, in which preferred embodiments of the invention are shown. This invention may, however, be embodied in many different forms and should not be construed as limited to the embodiments set forth herein; rather, these embodiments are provided so that this document will be thorough and complete, and will fully convey the scope of the invention to those skilled in the art. The elements of the drawings place emphasis upon clearly illustrating the principles of the present invention. In addition, like numerals refer to like elements throughout the several views.

In the following description, FIGS. 2, 4, 7A, 7B and 8 are flowchart illustrations of methods and systems according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 1:
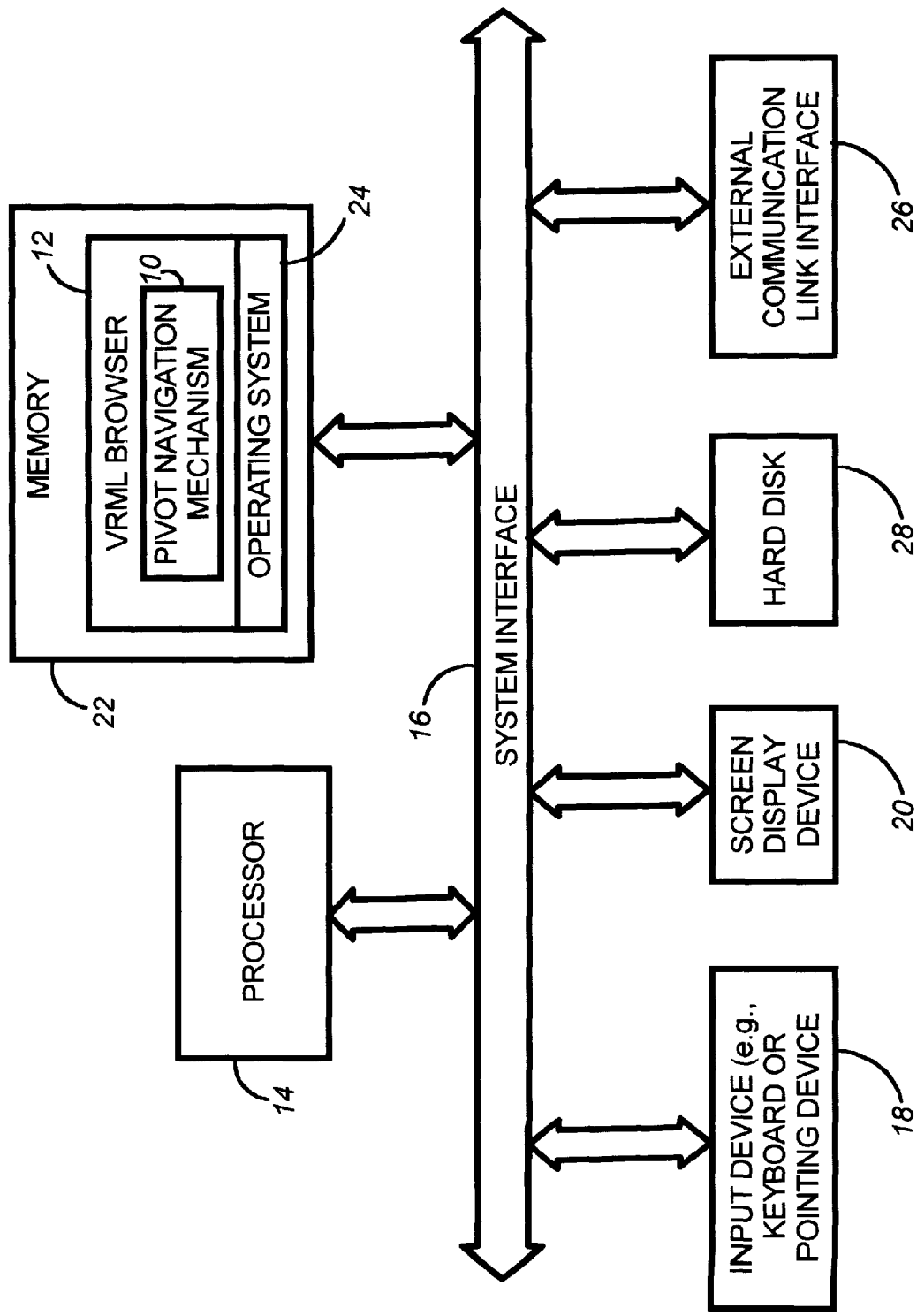
FIG. 1 is a block diagram illustrating a pivot navigation mechanism in accordance with the present invention situated within a computer-readable medium, for example, in the memory of a computer system.

With reference now to FIG. 1, illustrated is a computer system 8 which includes a pivot navigation mechanism 10 in accordance with the present invention. The navigation mechanism 10 may be implemented as a component of a three dimensional virtual reality browser such as a virtual reality modeling language (VRML) browser 12. The computer system 10 includes a processor 14 that communicates with the other elements within the computer system 10 via a system interface 16. An input device 18, for example, a keyboard or a pointing device, is used to input data from the user, and a screen display device 20, for example, a monitor, is used to output data to the user. A memory 22 within the computer system 10 includes the VRML browser 12 (and thus, the pivot navigation mechanism 10) and a conventional operating system 24 which communicates with the VRML browser 12 and enables execution of the VRML browser 12 (and thus, the pivot navigation mechanism 10) by the processor 14. An external communication link 26 is provided to interface the computer system 10 with other computer systems or computer-based machines such as in a local area network (LAN) or a wide area network (WAN), and/or for connecting to the Internet or an intranet. Lastly, a hard disk 28 may be provided as a persistent memory device, as is well known in the industry.

The VRML browser 12, as can be appreciated by those skilled in the art, may be a standalone software application, a plug-in application or a helper application, all of which are well known in the art. As a standalone application, the VRML browser 12 has network communication capability so as to be able to form a TCP/IP communication link to the Internet. An example of a standalone software application that is commercially available is WebSpace® Navigator (Silicon Graphics, Inc.). As a plug-in application, the VRML browser 12 operates inside the window of a web browser such as Navigator® (Netscape Communication Company). Examples of plug-in applications that are commercially available include Live3D (Netscape Communication Company), V*Realm (Integrated Data Systems, Inc.), and Cosmo Player (Silicon Graphics, Inc.). As a helper application, the VRML browser 12 is launched by the web browser into its own window when the browser detects a VRML document being downloaded. An example of a commercially available helper application is Community Place® (Sony Corporation).

As with a web browser, the VRML browser 12 is a client that serves a single user in a virtual reality world. The server is a computer that is connected to the Internet and that coordinates communication among one or more avatars operating on various clients, that is, VRML browsers. When the VRML browser 12 requests a VRML document located on a server, the server sends the requested VRML document to the VRML browser 12 for rendering. At the VRML browser 12, one or more rendering engines process the VRML document and display a three dimensional virtual world (or a scene of the world) on the screen display device 20. In addition to providing a visual rendering of the graphics comprising a three dimensional virtual reality world, a VRML browser 12 may also play audio files, MPEG movies, etc., via plug-in or helper applications associated with the VRML browser 12, as well known in the art.

The pivot navigation mechanism 10 is a software module of the VRML browser 12 that implements the present invention. The pivot navigation mechanism 10 can be embodied as a method, apparatus or computer program product. Accordingly, the pivot navigation mechanism 10 may take the form of an entirely hardware embodiment, an entirely software embodiment, or an embodiment combining both software and hardware aspects. Furthermore, the pivot navigation mechanism 10 may take the form of a computer program product on a computer-readable storage medium having computer-readable program code embodied in the medium. Any suitable computer-readable medium for use by or in connection with a computer system may include an electronic, magnetic, optical or other physical device or means that can contain or store computer program code for use by or in connection with a computer-related system or method.

Figure 2:
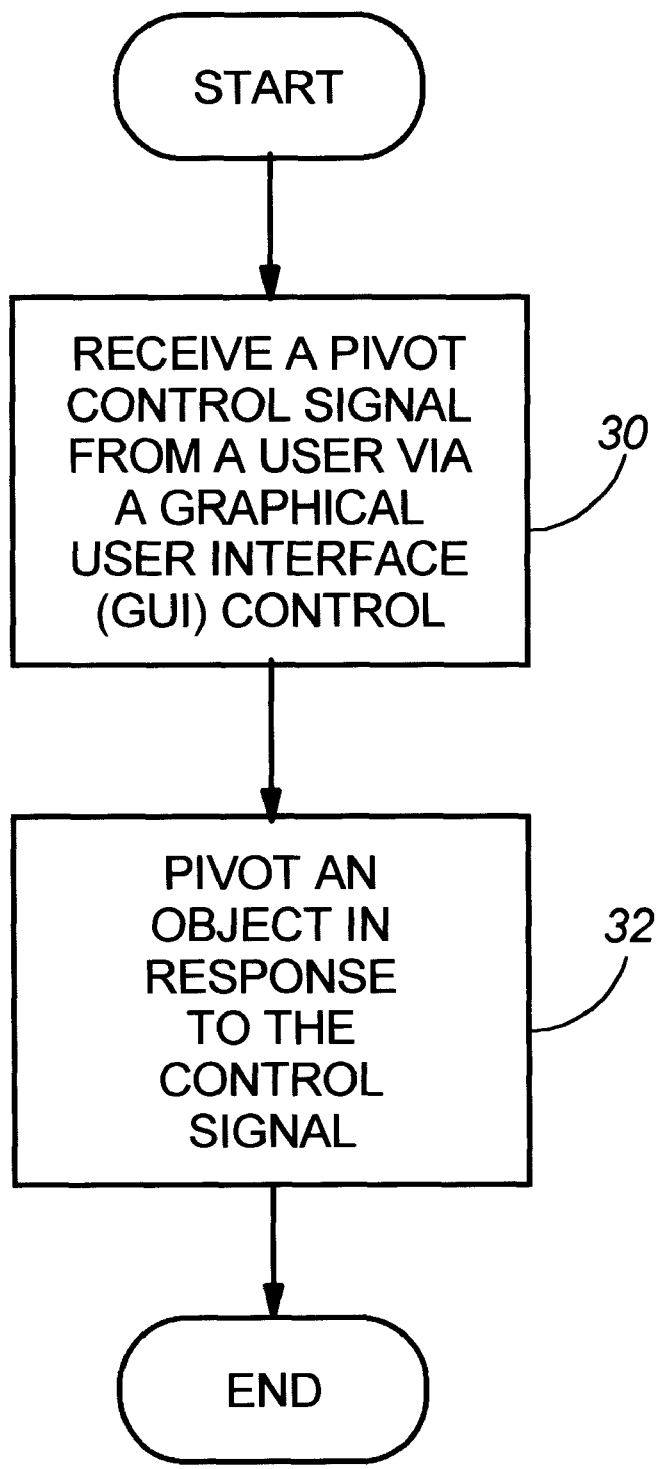
FIG. 2 is a flowchart depicting the operations carried out by the pivot navigation mechanism of FIG. 1.

Accordingly, the present invention, as implemented by the pivot navigation mechanism 10, provides for the navigation of an object in a three dimensional virtual world, whereby the user is able to pivot the object in place using a graphical user interface (GUI) control. As illustrated in FIG. 2, a pivot control signal is received from a user via a GUI control, as indicated by block 30. The object controlled is then pivoted in response to the pivot control signal, as indicated by block 32. In a three dimensional virtual world that is defined by reference to an x-axis, y-axis and z-axis so as to allow movement with six degrees of freedom (i.e., clockwise and counterclockwise about each axis), the pivot action of an object in accordance with the present invention preferably takes place with reference to the center point of the object in two of the six degrees of freedom. Thus, in a three dimensional virtual world where the x-axis denotes movement right to left, the z-axis denotes movement forward and backward, and the y-axis denotes movement up and down, the object preferably pivots about the y coordinate of its center point.

Figure 3:
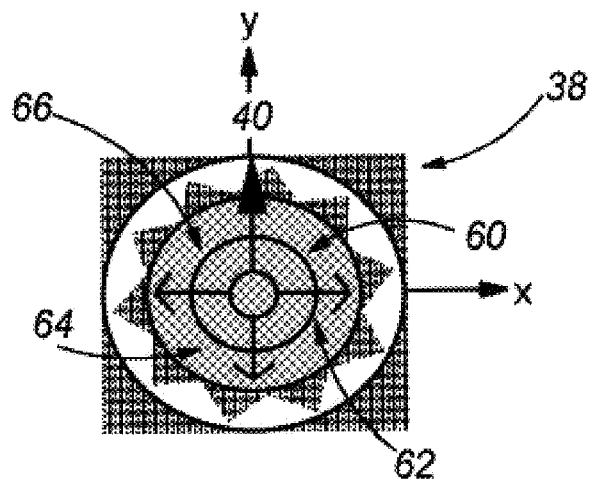
FIG. 3 is an example of a compass graphic user interface (GUI) control in accordance with the present invention, including a needle pointing in a direction that an object is facing.

The GUI control of the preferred embodiment of the present invention is a compass control 38, as illustrated in FIG. 3. The compass control 38 has a resemblance to a compass which is particularly advantageous because of its familiar appearance and basic association with directional or orientational devices. The compass control 38 includes a compass needle 40 which remains static. The needle 40 points in the direction that the object is looking, and therefore, will not change. Hence, the needle 40 can be used as a reference from which the degrees of pivot can be taken, as described in detail below. In general, a user utilizes a pointing device 18 such as a mouse to place a pointer over the compass control 38. The user can then click one of the buttons of the mouse to select a pivot angle relative to the needle 40. A composite angle is formed by the center point of the GUI control 38, the needle 40, and a line segment drawn from the center of the GUI control to its outer radius through the click point. The composite angle can be calculated in either degrees or radians. The composite angle is then sent to the VRML browser 12 which applies the rotational value to the object.

VRML browsers 12 offer programming API's to allow manipulation of objects in the scene or world on display by the VRML browser 12. In the preferred embodiment, an API known as the External Application API is used to link a Java application which manages and renders the GUI control to the VRML scene or world. As the compass control 38 is manipulated by the user with the pointing device 18, messages are sent to the VRML scene or world to cause the avatar to turn or pivot based on the user's manipulation of the compass control 38.

It is noted that in order to rotate the geometry of an avatar in accordance with the user's manipulation of the compass control 38, the visible nodes of the geometry should be enclosed in a transform node. As known in the industry and as described in the VRML Specification, Version 1.0 (or later), the functions that can be performed by a transform node include translate, scale and rotate. The transform node is programmable to allow a rotational value on a given axis to be altered. Altering the rotation value of the transform node causes the children nodes of the transform to rotate with respect to the new rotation value. A more detailed discussion of transform nodes and current VRML specifications can be found, for example, at http:\\vrml.sgi.com.

Figure 4:
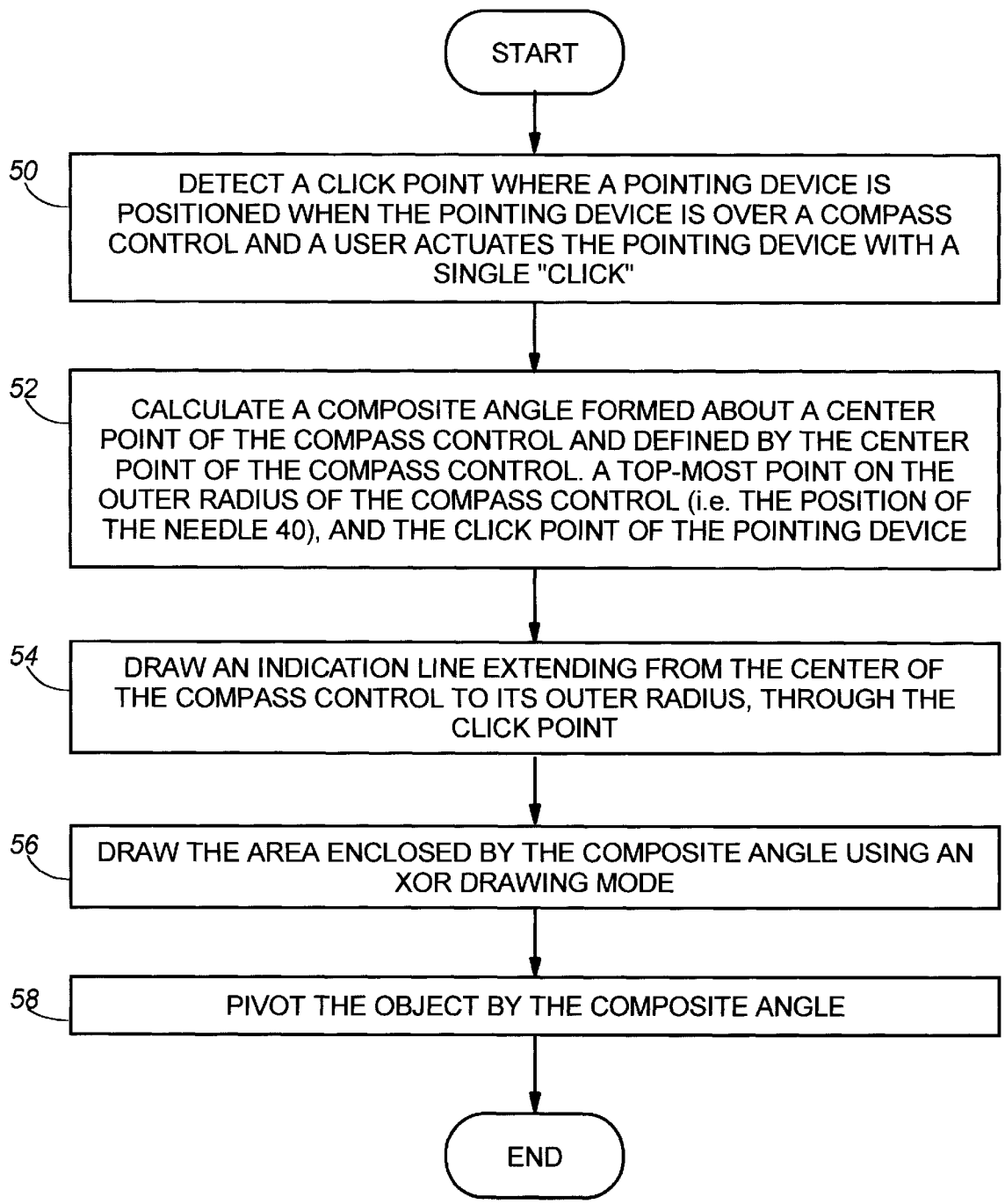
FIG. 4 is a flowchart depicting the operations carried out by the pivot navigation mechanism of FIG. 1 for a single click pivot.
Figure 7A:
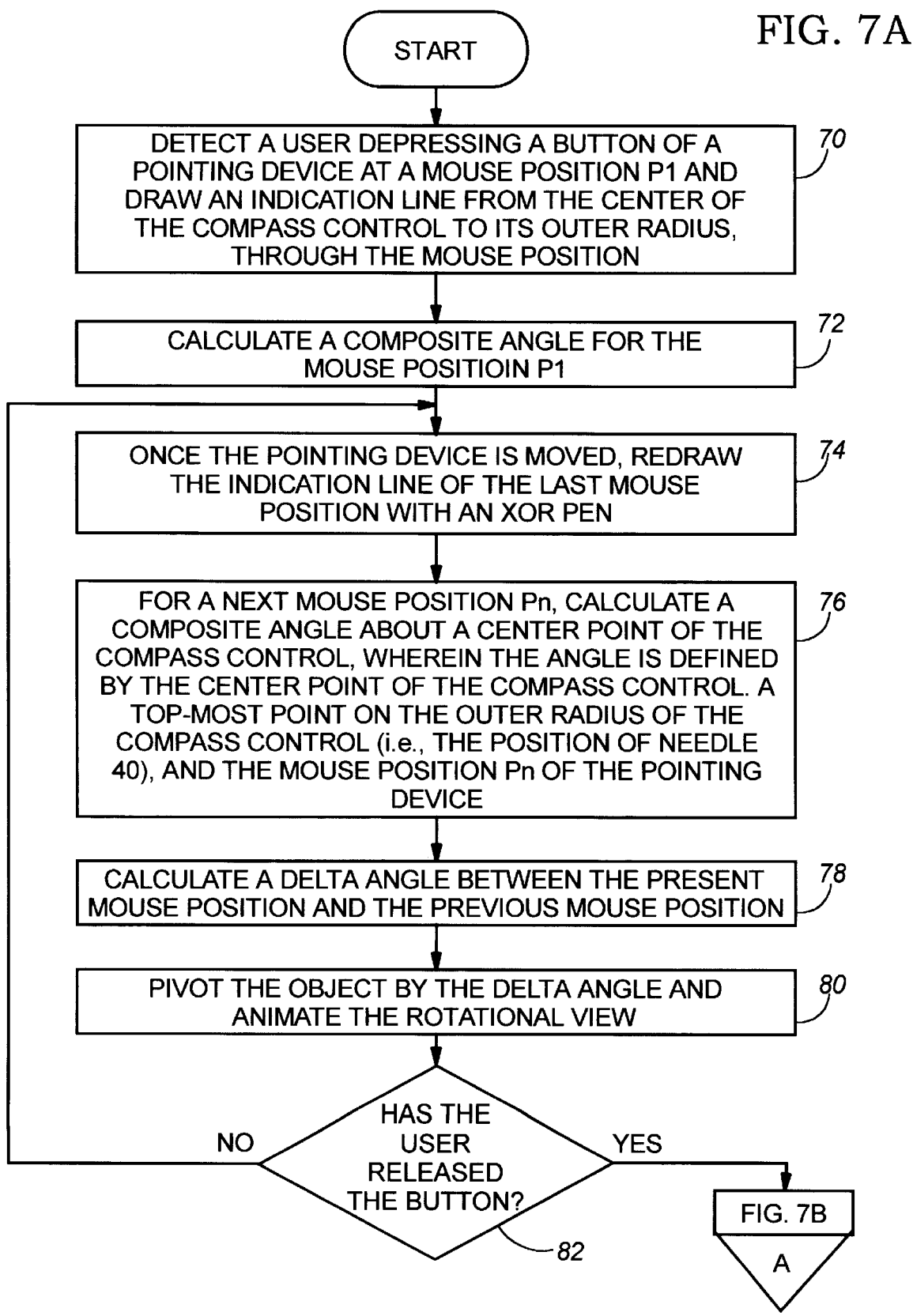
FIGS. 7A and 7B are flowcharts depicting the operations carried out by the pivot navigation mechanism of FIG. 1 for an animated pivot.
Figure 7B:
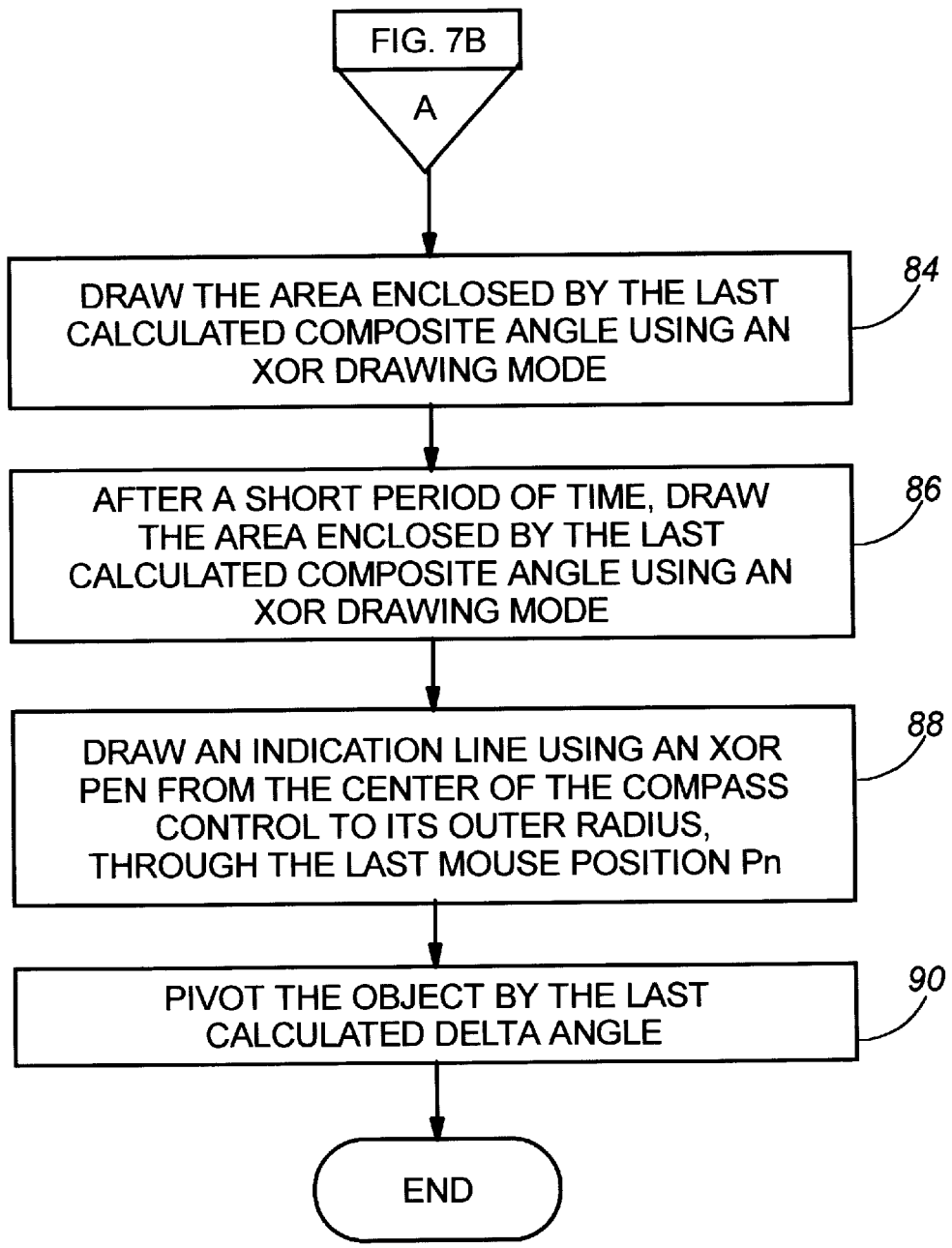
Figure 8:
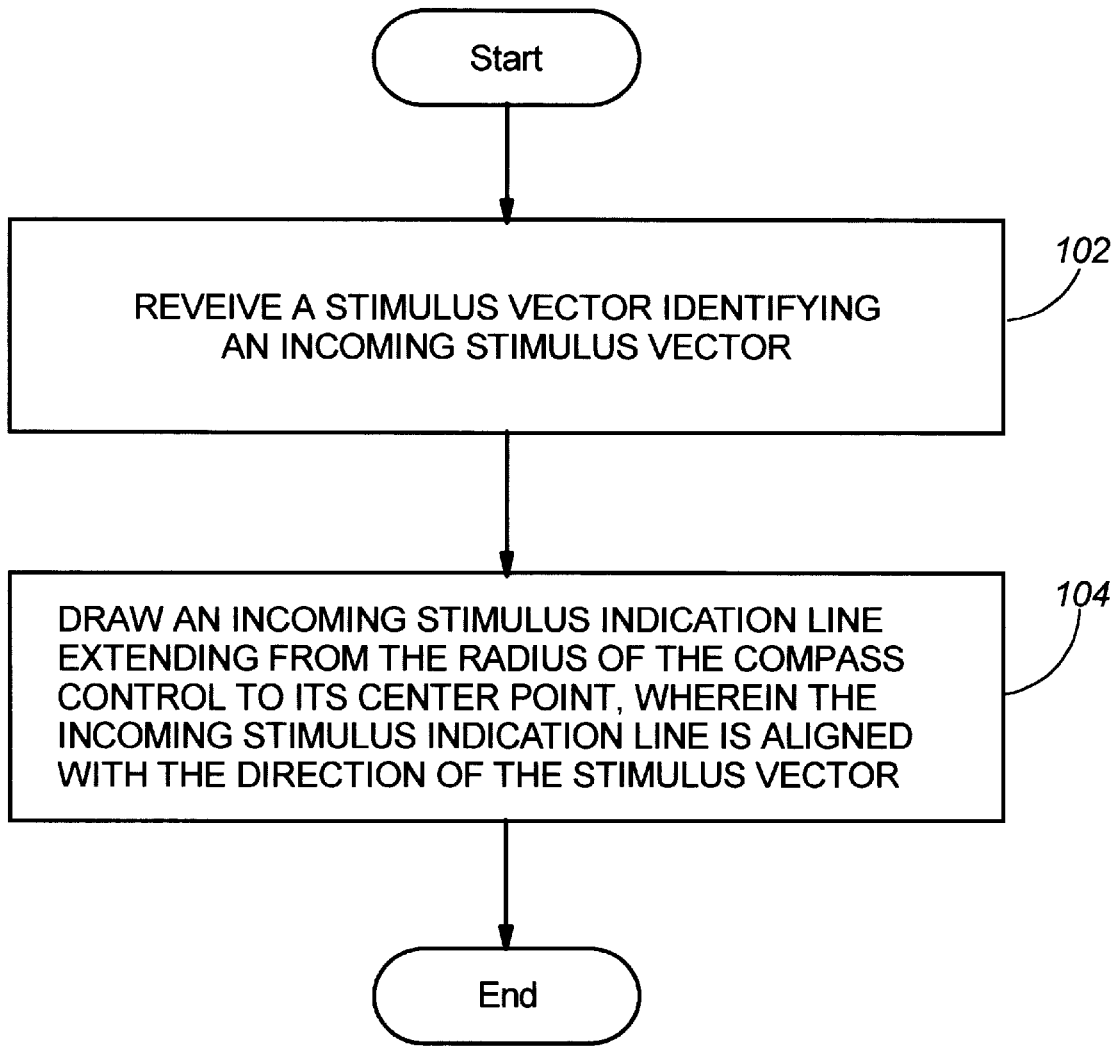
FIG. 8 is a flowchart depicting the operations carried out by the pivot navigation mechanism of FIG. 1 for detecting the direction of an incoming stimulus.

Numerous methods may be utilized imparting pivotal movement to the avatar using the compass control 38. For purposes of the present disclosure, the following describes three such methods as examples. The first method provides for an instantaneous pivot of an object to a selected relative direction, as illustrated in FIG. 4. A second method provides for an animated pivot whereby the object pivots under essentially real-time control of the user while a view from the object is displayed, as illustrated in FIGS. 7A and 7B. A third method provides for an incoming stimulus indicator, as illustrated in FIG. 8.

With reference to FIGS. 3 and 4, the first method allows a user to select a direction relative to needle 40. Initially, the compass control 38 displays a standard visual background as shown in FIG. 3. The user then positions the pointer at an arbitrary point on the compass control 38 using the mouse. The point on the compass control 38 where the user has positioned a pointer provides a relative degree of pivot with respect to the needle 40. This relative degree of pivot can be anywhere from one degree to 359 degrees in a clockwise direction. However, it is noted that the direction of rotation can be set by the user or determined based upon which direction provides the smaller composite angle. Thus, for example, rotations of from greater than 180° clockwise could be translated to corresponding rotations of less than 180° counterclockwise. The user then actuates the pointing device with a single click of the mouse and the click point where the pointing device is positioned is noted, as indicated by block 50 (FIG. 4). Next, a composite angle formed about the center point of the compass control 38 is calculated, wherein the composite angle is defined by the center of the compass control 38, the position of the needle 40, and the click point of the pointing device.

An example of how the composite angle may be calculated follows. With reference to FIG. 3, the compass control 38 can be expressed in a two dimensional sense defined by an x-axis and a y-axis with the compass control being oriented in a clockwise configuration, that is, the angle increases from zero degrees at the position of needle 40 in a clockwise direction. The compass control 38 is divided into four quadrants: a first quadrant 60, a second quadrant 62, a third quadrant 64, and a fourth quadrant 66. Initially, the quadrant of a click point is calculated using the following operation, wherein the click point coordinate is (clickPoint.x, clickPoint.y):

```
if( clickPoint.x >= centerX )      //Quadrant 1 or 2?
{                                  //Yes
   if( clickPoint.y <= centerY )   //Quadrant 1?
   {                               //Yes
      quadrant = 1;                //signal it
   }                               //
   else                            //Must be quadrant 2
   {                               //
      quadrant = 2;                //signal it
   }                               //
}                                  //
else                               //Must be quadrant 3 or 4
{                                  //
   if( clickPoint.y <= centerY )   //Quadrant 4?
   {                               //Yes
      quadrant = 4                 //signal it
   }                               //
   else                            //Must be quadrant 3
   {                               //
      quadrant = 3                 //signal it
   }                               //
}                                  //
```

An angle Φ with reference to the position of needle 40 is then calculated according to Equation (1) below:

$$\sin \Phi = a/b,$$

$$\Phi = (\arcSin(\sin \Phi) * 57.2957) \quad (1)$$

wherein $a = |\text{clickPoint.x} - \text{centerX}|$, $c = |\text{centerY} - \text{centerPoint.y}|$, and $b = \sqrt{(a*a) + (c*c)}$. Thus, the composite angle can be determined according to the following operation:

```
if (clickPoint is in Quadrant1)
{
    compositeAngle = Φ
}
else if (clickPoint is in Quadrant2)
{
    compositeAngle = 90 degrees + (90 − Φ)
}
else if (clickPoint is in Quadrant3)
{
    compositeAngle = 180 + Φ
}
else                            // must be Quadrant4
{
    compositeAngle = 270 + (90 − Φ)
}
```

Note, however, this is only one of several methods by which a relative location of a click point within the control compass 38 can be calculated.

Figure 5:
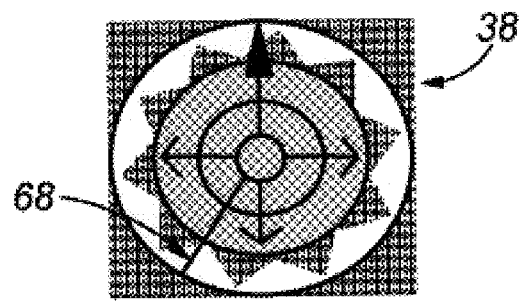
FIG. 5 is an example of the compass GUI control of FIG. 3 with an indication line indicating the pivot requested by a user.
Figure 6:
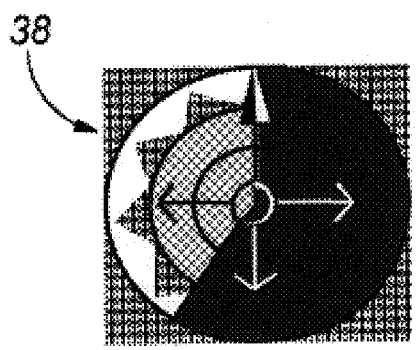
FIG. 6 is an example of a compass GUI control of FIG. 3 illustrating a reverse video of the area from where the object was originally facing to its new direction.

Referring back to FIG. 4, once the composite angle has been calculated, an indication line 68, as illustrated in FIG. 5, is drawn extending from the center point of the compass control 38 to its outer radius, through the click point, using an XOR pen, as indicated by block 54. At block 56, the area enclosed by the composite angle is drawn using an XOR pen drawing mode to produce a reverse video area showing the user the angle selected for rotation, as illustrated in FIG. 6. The pivot navigation mechanism 10 then prevents further user input for a predetermined period of time to allow the user to perceive the reverse video action. The area enclosed by the composite angle is then drawn again using an XOR drawing mode to produce a reverse video area of the angle selected for rotation. This restores the control compass to its original appearance, with the first line segment 68 still showing. The line segment 68 is then drawn using an XOR pen to turn off the line segment and return the compass control to its initial display state. The angular value is then utilized by the VRML browser 12 in making the appropriate application program interface (API) calls to effectuate the pivot of the object, as reflected by block 58.

With reference to FIGS. 7A and 7B, a second embodiment of the present invention allows a user to control the rotation of the object in essentially real time while providing animation based upon the current angle with respect to the needle 40. It should be noted at this point that if the compass control 38 is being utilized to control the pivot of an avatar, the second embodiment allows the user to view the change in scenery as the avatar is pivoted under essentially real-time control of the user relative to the original direction of view as indicated by needle 40. Alternatively, if the compass control 38 is utilized to pivot an object within a virtual reality world, the user is able to view the object as it pivots in place so as to be able to view different surfaces of the object as the object rotates under essentially real-time control of the user.

As with the previous embodiment, the compass control 38 initially displays a standard visual background, as shown in FIG. 3. The user then positions the pointing device to a desired point in the compass control 38. The user then depresses a button of the pointing device 18 such as a mouse at a mouse position P1 (not shown) in the compass control 38 and maintains the mouse button depressed. An indication line is then drawn from the center point of the compass control 38, through the mouse position P1, to its outer radius using an XOR pen, as indicated by block 70. A composite angle is then calculated for the mouse position P1 in substantially the same manner as described above with reference to FIG. 4, as indicated by block 72. As the user drags the mouse, a move message is received from the mouse with an updated mouse position Pn (not shown), which reflects a next position of the mouse on control compass 38. The indication line associated with mouse position P1 is then drawn again using an XOR pen to restore the compass control 38 to its initial state, as indicated by block 74. For the next mouse position Pn, an indication line extending from the center point of the compass control 38, through the mouse position Pn, to its outer radius is drawn using an XOR pen. At block 76, a composite angle is calculated for mouse position Pn in substantially the same manner as described above with reference to FIG. 4. Next, a delta-angle is calculated by subtracting the composite angle for the last mouse position from the composite angle for the mouse position Pn, as indicated by block 78. The calculated delta-angle is then provided to the VRML browser 12 which makes the appropriate API calls for imparting a pivot action on the object according to the delta angular value. The view of the object is also updated to correspond with the current pivot position of the object for presentation to the user via screen display device 20.

It is then determined at decision block 82 whether the user has released the button of the mouse. If the user has not released the button, then block 82 refers back to the operations of blocks 75–80 where the next mouse position Pn is processed. If the user has released the button, then decision block 82 refers to block 84 of FIG. 7B where the area enclosed by the last composite angle is drawn using an XOR mode to produce a reverse video area showing the user the angle selected for pivot. Following a brief sleep period in which the user is allowed to view the reverse video, the area enclosed by the composite angle is drawn again using an XOR drawing mode to produce a reverse video area showing the user the angle selected for rotation, thereby restoring the compass control 38 to its original state with the last indication line that was drawn still showing, as indicated by block 86. The last indication line is then drawn again using an XOR pen from the center of the compass control 38, through the last mouse position Pn, to its outer radius as indicated by block 88. This turns off the last indication line restoring the control compass to its initial display state. Lastly, as indicated by block 90, the object is pivoted by the angular value of the last composite angle. This may be implemented by sending the angular value of the last composite angle to the VRML browser 12 which makes the appropriate API calls to pivot the object.

The third method provides for the detection of an incoming stimulus in a three dimensional virtual world or scene so as to generate an incoming stimulus indicator that may be used by the user to initiate a pivot of the object to face the incoming stimulus. This is particularly advantageous when the object is an avatar, whereby an avatar is able to turn and face an incoming stimulus. Initially, the compass control displays its standard visual background, as illustrated in FIG. 3. The VRML browser 12 then receives a message from the server that indicates a stimulus vector defining the location of a stimulus, as indicated by block 102. The stimulus vector is preferably indicated as an angular value with respect to the avatar. In addition, the message received from the server may provide information regarding the nature of the stimulus, such as whether the stimulus is friendly or aggressive. An incoming stimulus indication line is then drawn from the radius of the compass control to its center, as indicated by block 104, wherein the incoming stimulus indication line is aligned with the stimulus vector. Preferably, the incoming stimulus indication line is drawn in a visually highlighted color so as to distinguish it as an incoming stimulus indicator. The color of the stimulus indication line may be defined to convey information regarding the nature of the incoming stimulus. For instance, a green stimulus indication line may indicate a friendly stimulus such as a handshake, whereas a red stimulus indication line may indicate an aggressive stimulus such as a punch. Thereafter, the user may pivot the object in accordance with the operation of a compass control as described with reference to either FIG. 4, or FIGS. 7A and 7B. It is noted that the incoming stimulus indication line appears substantially the same as the indication line 68 of FIG. 5, once drawn, but may be of another color or have other such indicia so as to differentiate the stimulus indication from the rotation indication line 68.

The foregoing is illustrative of the present invention and is not to be construed as limiting thereof. Although a few exemplary embodiments of this invention have been described, those of skill in the art would readily appreciate that many modifications and variations are possible in the exemplary embodiments without materially departing from the novel teachings and advantages of this invention. Accordingly, all such modifications and variations are intended to be included within the scope of this invention as defined in the claims. In the claims, means-plus-function clauses are intended to cover the structure described herein as performing their recited functions and not only structural equivalents but also equivalent structures.

That which is claimed is:

1. A method for navigating an object in a three dimensional virtual world, comprising the steps of:

displaying a graphical user interface (GUI) control for navigating an object in the three dimensional virtual world, wherein the GUI control provides directional information associated with the object;

displaying, on the GUI control, directional information associated with an incoming stimulus vector of another object in the three dimensional virtual world;

receiving a pivot control signal from a user via the graphical user interface control;

determining an angular value utilizing the pivot control signal, wherein the angular value includes an indication of pivot direction; and pivoting the object in response to the pivot control signal; and wherein the step of displaying a graphical user interface control comprises the step of providing a compass control for receiving the pivot control signal that identifies a click point on the compass GUI control and wherein said step of determining the angular value includes the step of calculating an angle about a center point of the compass GUI control, wherein the angle is defined by the center point of the compass GUI control, a top-most point on the outer radius of the compass GUI control, and the click point on the compass GUI control.

2. The method of claim 1, wherein the virtual reality world is defined with reference to an x-axis, y-axis and z-axis to allow navigation with six degrees of freedom, and wherein the object pivots in two of the six degrees of freedom.

3. The method of claim 2, wherein the two of the six degrees of freedom is about the y-axis of the object.

4. The method of claim 1, further including the step of calculating a delta-angle which represents an angular difference between two consecutive angular values.

5. The method of claim 1, wherein said step of pivoting the object includes substantially instantaneously pivoting the object.

6. The method of claim 1, wherein said step of pivoting the object includes dragging the object in a pivot, wherein the object view is displayed during the pivot.

7. The method of claim 1, wherein the angular value is substantially equal to a direction of the incoming stimulus vector.

8. The method of claim 1, wherein the object is an avatar.

9. The method of claim 1, wherein pivoting the object provides for pivoting the point of view of a user in the virtual world.

10. An apparatus for navigating an object in a three dimensional virtual world, comprising:

means for displaying a graphical user interface (GUI) control for navigating an object in the three dimensional virtual world, wherein the GUI control provides directional information associated with the object;

means for displaying on the GUI control, directional information associated with an incoming stimulus vector of another object in the three dimensional virtual world;

means for receiving a pivot control signal;

means for determining an angular value utilizing the pivot control signal; and means for pivoting the object in response to the pivot control signal;

wherein the means for displaying a graphical user interface control comprises means for providing a compass GUI control for receiving the pivot control signal.

11. The apparatus of claim 10, further including means for calculating a delta-angle which represents an angular difference between two consecutive angular values.

12. The apparatus of claim 10, further including means for dragging the object in a pivot, wherein the object view is displayed during the pivot.

13. The apparatus of claim 10, wherein the object is an avatar.

14. A computer program product for navigating an object in a three dimensional virtual world, the computer program product comprising:

a computer-readable storage medium having computer-readable program code embodied in said medium, said computer-readable program code comprising:

computer readable program code which displays a graphical user interface (GUI) control for navigating an object in the three dimensional virtual environment, wherein the GUI control provides directional information associated with the object;

computer readable program code which displays on the GUI control, directional information associated with an incoming stimulus vector of another object in the three dimensional virtual world;

computer readable program code which receives a pivot control signal;

computer readable program code which determines an angular value utilizing the pivot control signal; and computer readable program code which pivots the object in response to the pivot control signal; and wherein the computer readable program code which displays a graphical user interface control comprises computer readable program code which provides a compass GUI control for receiving the pivot control signal.

15. The computer program product of claim 14, further including computer readable program code which calculates a delta-angle which represents an angular difference between two consecutive angular values.

16. The computer program product of claim 14, further including computer readable program code which drags the object in a pivot, wherein the object view is displayed during the pivot.

* * * * *

UNITED STATES PATENT AND TRADEMARK OFFICE
CERTIFICATE OF CORRECTION

PATENT NO. : 6,144,381
DATED : November 7, 2000
INVENTOR(S) : Lection et al.

It is certified that error appears in the above-identified patent and that said Letters Patent is hereby corrected as shown below:

<u>Title page,</u>
*Attorney, Agent, or Firm,* please delete "Shelby" and substitute -- Sibley -- therefor.

<u>Drawings,</u>
Figure 7A, please delete "POSITION" and substitute -- POSITION -- therefor.
Figure 8, please delete "REVEIVE" and substitute -- RECEIVE -- therefor.

Signed and Sealed this

Twenty-eighth Day of May, 2002

*Attest:*

JAMES E. ROGAN
*Attesting Officer*        *Director of the United States Patent and Trademark Office*